(12) United States Patent
Gotoh

(10) Patent No.: US 8,130,410 B2
(45) Date of Patent: Mar. 6, 2012

(54) IMAGE PROCESSING METHOD, IMAGE PROCESSING APPARATUS, IMAGE FORMING SYSTEM AND RECORDING MEDIUM READABLE BY A COMPUTER

(75) Inventor: Makio Gotoh, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 690 days.

(21) Appl. No.: 12/251,256

(22) Filed: Oct. 14, 2008

(65) Prior Publication Data

US 2009/0097043 A1   Apr. 16, 2009

(30) Foreign Application Priority Data

Oct. 15, 2007 (JP) .................. 2007-268171

(51) Int. Cl.
*H04N 1/405* (2006.01)

(52) U.S. Cl. .............. 358/1.2; 358/3.06; 358/528

(58) Field of Classification Search .............. 358/1.9, 358/2.1, 1.2, 3.06–3.09, 3.21–3.22, 3.12, 358/528, 449, 451
See application file for complete search history.

(56) References Cited

U.S. PATENT DOCUMENTS

| | | |
|---|---|---|
| 4,701,808 A | 10/1987 | Nagashima et al. |
| 5,200,840 A | 4/1993 | Koike et al. |
| 5,418,899 A | 5/1995 | Aoki et al. |
| 5,712,929 A * | 1/1998 | Kawamura et al. .......... 382/270 |

FOREIGN PATENT DOCUMENTS

| | | |
|---|---|---|
| JP | 60-097774 A | 5/1985 |
| JP | 61-82577 A | 4/1986 |
| JP | 1-136465 A | 5/1989 |
| JP | 1-218173 A | 8/1989 |
| JP | 3-40179 A | 2/1991 |
| JP | 5-328106 A | 12/1993 |
| JP | 1-218173 A | 8/1999 |
| JP | 2000-263875 A | 9/2000 |
| JP | 2001-229002 A | 8/2001 |
| JP | 2001229002 A * | 8/2001 |
| JP | 2001268376 A * | 9/2001 |
| JP | 2002-232708 A | 8/2002 |

* cited by examiner

*Primary Examiner* — Thomas D Lee
*Assistant Examiner* — Stephen M Brinich
(74) *Attorney, Agent, or Firm* — Birch, Stewart, Kolasch & Birch, LLP

(57) ABSTRACT

The image processing apparatus executes a zoom process to an image data depending on a received zoom level, selects a dither matrix from a plurality of dither matrices each having a different resolution. The image processing apparatus selects a dither matrix that has a higher resolution in a case that the received zoom level is equal or less than a first zoom level to reduce the image data. Furthermore, the image processing apparatus selects a dither matrix that has a lower resolution in a case that the received zoom level is equal or more than a second zoom level to enlarge the image data.

12 Claims, 15 Drawing Sheets

F I G. 3

| ZOOM LEVEL (%) | RESOLUTION (LINES PER INCH) | DETAIL REPRODUCIBILITY | GRAININESS AND TONE | DITHER MATRIX |
|---|---|---|---|---|
| m≦50 | 300 | ◎ | △ | A |
| 50<m<200 | 200 | ○ | ○ | B |
| 200≦m | 150 | △ | ◎ | C |

| ZOOM LEVEL (%) | TEXT DOCUMENT | PHOTOGRAPHIC-PICTURE DOCUMENT OR TEXT PHOTOGRAPHIC-PICTURE DOCUMENT | PRINTED-PICTURE DOCUMENT OR TEXT PRINTED-PICTURE DOCUMENT |
|---|---|---|---|
| m≦50 | A | C | A |
| 50<m<200 | A | C | B |
| 200≦m | A | C | C |

|    |    |    | 30 | 22 | 34 |    |
|----|----|----|----|----|----|----|
| 28 | 20 | 32 | 38 | 2  | 6  |    |
| 36 | 0  | 4  | 18 | 10 | 14 | 26 |
| 16 | 8  | 12 | 24 | 29 | 21 | 33 |
|    | 31 | 23 | 35 | 37 | 1  | 5  |
|    | 39 | 3  | 7  | 17 | 9  | 13 | 25 |
|    |    | 19 | 11 | 15 | 27 |    |

IMAGE PROCESSING METHOD, IMAGE PROCESSING APPARATUS, IMAGE FORMING SYSTEM AND RECORDING MEDIUM READABLE BY A COMPUTER

This Nonprovisional application claims priority under 35 U.S.C. §119(a) on Patent Application No. 2007-268171 filed in Japan on Oct. 15, 2007, the entire contents of which are hereby incorporated by reference.

BACKGROUND OF THE INVENTION

1. Field of the Invention

The present invention relates to: an image processing method which enables a zoom process of enlargement or reduction for image data as well as a dither process for producing halftone; an image processing apparatus for executing the method; an image forming system provided with the apparatus; and a recording medium which records a computer program for causing a computer to execute the method.

2. Description of Related Art

Conventionally, an image forming system for carrying out digital processing to a color image and outputting the image, such as an electrophotographic digital color multi function peripheral, an inkjet color printer or a thermal transfer color printer, is increasingly popular in the field of OA (Office Automation) equipments in which the digital technology is proceeding at a rapid rate.

For example, an image information, which is inputted from an input device such as a digital camera or an image scanner or created by a computer, is outputted from the above image forming system after a pseudo tone reproduction process (halftone process) is carried out for inputted image information.

An approach of the pseudo tone reproduction technology is a multi-level dithering process, in which a quantization process is performed for each pixel of a dither matrix shown in FIG. 15 (here, a number in each cell indicates the order of allocation of a dense output value), for example, on the basis of the magnitude relation with a plurality of thresholds corresponding respectively, to output any one of a plurality of output values or an output value converted on the basis of a conversion table.

Moreover, a conventional image forming system receives an output size of an image which is specified by the user and performs a zoom process depending on the received output size. For example, an output size of an image is enlarged by interpolating adjacent pixels or the like when a instruction for enlargement of an output size is received, or an output size of an image is reduced by downsampling pixels or the like when a instruction for reduction of an output size is received.

Regarding a conventional image forming system described above, various methods of image processing have been tested to smoothly execute a tone reproduction process and a zoom process. For example, Japanese Patent Application Laid-Open No. H1-136465 and Japanese Patent Application Laid-Open No. S60-97774 suggest methods for carrying out a tone reproduction process and a zoom process for image data.

SUMMARY OF THE INVENTION

However, a method described in the Japanese Patent Application Laid-Open No. H1-136465 has a problem such as graininess deterioration or generation of an interference pattern which causes image degradation, since a zoom process is performed for a pixel of an image binarized in a tone reproduction process, that is, a binarized pixel which is white or black is interpolated or downsampled.

The Japanese Patent Application Laid-Open No. S60-97774 suggests a method for carrying out a zoom process for image data first and then carrying out a tone reproduction process using a dither matrix which has the same size in both case of enlargement and reduction for zoom process. The Japanese Patent Application Laid-Open No. S60-97774 uses a dither matrix having the same size, i.e. a screen having the same LPI (Lines Per Inch), regardless of enlargement and reduction for zoom process. Accordingly, there is a problem that a small text, a small symbol or the like in a reduced image becomes unreadable because of insufficient resolution when a tone reproduction process is executed for an image data after zoom process to reduce an output size of the image. Furthermore, when a tone reproduction process is executed for an image data after zoom process to enlarge an output size of the image, there is a problem that image degradation is caused because graininess is further emphasized by enlargement of the image.

The present invention has been made with the aim of solving the above problems, and it is an object thereof to provide: an image processing method for changing a magnification of image data depending on a set zoom level selecting any one of a plurality of dither matrices having different resolution (e.g. LPIs) depending on the zoom level used for changing a magnification of an image data and performing a dither process using the selected dither matrix so as to select a dither matrix having the most suitable resolution for the image data that has been executed zoom process, and execute a dither process for image data using the selected suitable dither matrix; an image processing apparatus for executing the method; an image forming system provided with the device; and a computer program product which stores a computer program for causing a computer to execute the method.

An image processing method according to the first aspect of the present invention is an image processing method for setting a zoom level, executing a zoom process to an image data corresponding to the set zoom level, and then dithering the image data with a dither matrix that is selected on the basis of the set zoom level, comprising: a step of selecting a dither matrix that has a higher resolution in a case that the set zoom level is equal or less than a first zoom level, and a dither matrix that has a lower resolution in a case that the set zoom level is equal or more than a second zoom level, which is higher than the first zoom level; and a step of dithering the image data, after executing the zoom process, using the selected dither matrix.

With the image processing method according to the first aspect, any one of a plurality of dither matrices having different resolution is selected depending on a zoom level used for zoom process to an image data. A dither matrix having a high resolution is selected depending on a magnification when a reduction process using a predetermined magnification is performed for an image data. On the other hand, a dither matrix having a low resolution is selected depending on a magnification when an enlargement process using a predetermined magnification is performed for an image data. By performing a dither process using a selected dither matrix, halftone is produced while maintaining satisfactory reproducibility of a text, a graphic or the like in a reduced image. Moreover, halftone is produced while restraining the emphasis of the graininess generated in an enlarged image.

Accordingly, it is possible to avoid generation of noticeable graininess in performing a zoom process and a dither process for an image data and prevent image degradation in a digital color multi-function peripheral or the like. It is also possible to perform a dither process while maintaining satisfactory reproducibility of a text, a graphic or the like in an image reduced by a zoom process and perform a dither process while restraining the emphasis of the graininess generated in an image enlarged by a magnification changing.

An image processing method according to the second aspect of the present invention is an image processing method preferably comprising a step of judging whether the image data belongs to a halftone dot area, wherein a dither matrix is selected on the basis of the set zoom level, when it is judged to belong to the halftone dot area.

With the image processing method according to the second aspect, any one of a plurality of dither matrices having different resolution is selected depending on a zoom level used for a zoom process to an image data when it is judged that the image data belongs to a halftone dot region. Thus, it is especially possible to reproduce favorably a halftone text or a text on halftone dot area that the reproducibility tends to be decreased by a zoom process for the image data.

An image processing method according to the third aspect of the present invention is an image processing method preferably comprising a step of judging whether a document indicated by the image data comprises a printed picture constituted with halftone dots, wherein a dither matrix is selected on the basis of the set zoom level, when it is judged to comprise the printed picture.

With the image processing method according to the third aspect of the present invention, any one of a plurality of dither matrices having different resolution is selected depending on a zoom level used for a zoom process to an image data when it is judged that a type of an image indicated by an image data includes a printed-picture which is composed of halftone dots, a small text existing in printed-picture or detail information of printed-picture composed of halftone dots. Thus, it is especially possible to reproduce favorably the printed-picture that the reproducibility tends to be decreased by a zoom process for the image data.

The above and further objects and features of the invention will more fully be apparent from the following detailed description with accompanying drawings.

BRIEF DESCRIPTION OF THE DRAWINGS

FIG. 3 is a schematic view for showing an example of a stored selection table;

FIG. 11 is a schematic view for showing an example of a stored selection table according to Embodiment 2;

FIG. 15 is a conceptual view for explaining a conventional dithering method.

DESCRIPTION OF THE PREFERRED EMBODIMENTS (Embodiment 1)

Figure 1:
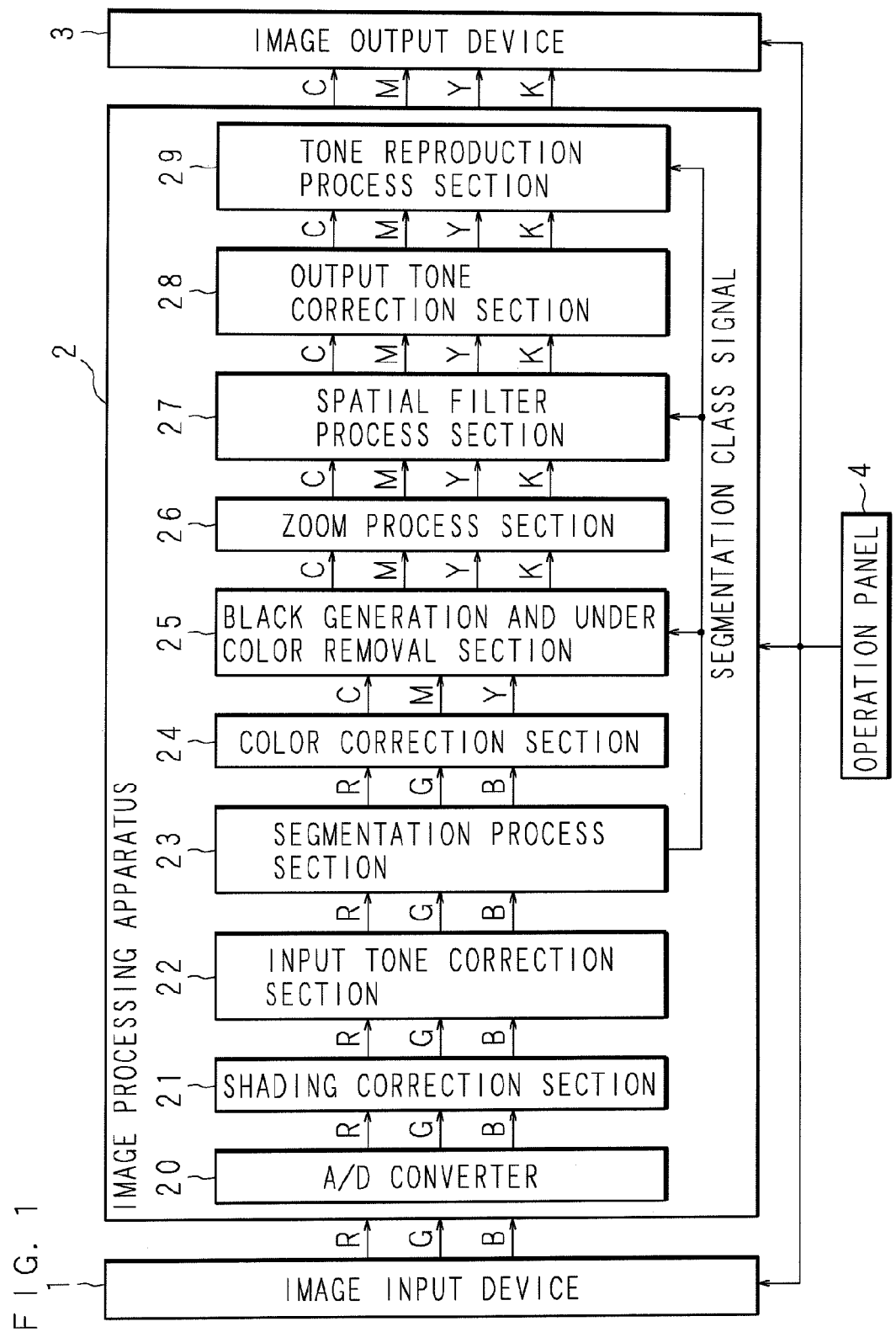
FIG. 1 is a block diagram for showing an entire structure of an image forming system comprising an image processing apparatus according to Embodiment 1.

The following description will explain an image processing method, an image processing device, an image forming system, a computer program and a computer program product according to the present invention with reference to the drawings illustrating some embodiments thereof. FIG. 1 is a block diagram for showing an entire structure of an image forming system including an image processing apparatus according to Embodiment 1. The description of Embodiment 1 will explain an example in which an image forming system is a digital color copying machine. However, an image forming system according to the present invention is not limited to this and may be a digital color copying machine, a digital color complex machine or the like. Moreover, the present invention can be also applied to a case in which an image read by an image reading apparatus such as a scanner is outputted by a printer such as a color printer.

The image forming system in FIG. 1 is composed of an image input device 1, an image processing apparatus 2, an image output device 3 and an operation panel 4. The image input device 1 is, for example, a scanner provided with a CCD (Charged Coupled Device), which accepts reflected light from a document as an RGB analog signal and outputs the signal-to the image processing apparatus 2. The image processing apparatus 2 carries out a process, which will be described later, for the accepted RGB analog signal and outputs the signal to the image output device 3 as a CM digital color signal. The image output device 3 is, for example, a color image output device using an electrophotographic method or an inkjet method, which accepts the CMYK digital color signal outputted from the image processing apparatus 2 and outputs a color image on a recording medium, such as paper, on the basis of the accepted digital color signal. The operation panel 4 is composed of, for example, a display section such as a liquid crystal display, and a manual operation button. The operation panel 4 outputs an indicator signal to the image processing apparatus 2 when the manual operation button is pressed. The image processing apparatus 2 performs an operation based on the indicator signal.

The image processing apparatus 2 is composed of an A/D converter 20, a shading correction-section (unit) 21, an input tone correction section 22, a segmentation process section 23, a color correction section 24, a black generation and under color removal section 25, a zoom process section 26, a spatial filter process section 27, an output tone correction section 28 and a tone reproduction process section 29. The image processing apparatus 2 is also provided with a CPU (Central Processing Unit) (not illustrated) or a DSP (Digital Signal Processor) (not illustrated), which controls the respective hardware.

The A/D converter 20 converts an RGB analog signal accepted from the image input device 1 into a digital signal and outputs the digital signal obtained by A/D conversion to the shading correction section 21.

The shading correction section 21 accepts the digital signal outputted from the A/D converter 20 and performs a process for the accepted digital signal to remove various distortions caused by a lightning system, an image focusing system and an image sensing system of the image input device 1. The shading correction section 21 also converts a reflectance signal of RGB into a signal, such as a density signal (pixel value), which is easy to handle for image processing apparatus performs a process to adjust color balance and outputs a processed digital signal to the input tone correction section 22.

The input tone correction section 22 accepts the digital signal outputted from the shading correction section 21, carries out a removal process of page background density or adjusts image quality such as contrast or the like for the accepted digital signal, and outputs a processed digital signal to the segmentation process section 23.

The segmentation process section 23 accepts the digital signal outputted from the input tone correction section 22 and executes a segmentation process to separate the inputted image data into, for example, any one of a text region, a halftone dot region and a photograph region (continuous tone region) on the basis of the accepted digital signal. The procedure of the segmentation process will be described later.

The segmentation process section 23 also generates a segmentation class signal which represents a text region, a halftone dot region and/or a photograph region on the basis of the result of the segmentation process, outputs the generated segmentation class signal to the black generation and under color removal section 25, the spatial filter process section 27 and the tone reproduction process section 29, and outputs the digital signal accepted from the input tone correction section 22 to the color correction section 24.

The color correction section 24 accepts the digital signal outputted from the segmentation process section 23, carries out a process to remove from the accepted digital signal a color impurity that is caused by the spectral textistic of a CMK color material including an useless absorption component, and outputs a processed digital signal to the black generation and under color removal section 25.

The black generation and under color removal section 25 accepts the digital signal (CMY) outputted from the color correction section 24, generates a black signal (K) on the basis of the accepted digital signal, subtracts the generated black signal from said digital signal to generate a new digital signal (CMY), and outputs the generated new digital signal (CMY) and black signal (K) respectively to the zoom process section 26. The black generation and under color removal section 25 also accepts the segmentation class signal outputted from the segmentation process section 23, and executes a black generation and under color removal process with reference to the accepted segmentation class signal.

It should be noted that an example of a black generation process uses skeleton black. In this example, black generation under color removal is performed on the basis of the following expression, assuming that the input-output textistic of a skeleton curve is y=f(x), the accepted digital signals are C, M and Y, the digital signals to be outputted are C', M', Y' and K', and a UCR (Under Color Removal) ratio is α (0<α<1):

$K'=f\{\min(C,M,Y)\}$ [Formula 1]

$C'=C-\alpha K'$ $M'=M-\alpha K'$ $Y'=Y-\alpha K'$

When the operation panel 4 accepts a indicator signal about a zoom level (enlargement, reduction or the like), the zoom process section 26 enlarges or reduces the output size of an image on the basis of the accepted indicator signal. The zoom process section 26 enlarges or reduces an image, that is indicated by the digital signal outputted from the black generation and under color removal section 25, by performing an interpolation operation for pixels in a main scanning direction and a sub-scanning direction of the image. The zoom process section 26 outputs to the spatial filter process section 27 a digital signal (CMYK) that represents an enlarged or reduced image. The zoom process section 26 also outputs a zoom level m of the image to the tone reproduction process section 29.

It should be noted that the description of Embodiment 1 explained an example of an interpolation operation for pixels in a main scanning direction and in a sub-scanning direction of an image. However, the present invention is not limited to this. The present invention may carry out an optical zoom process for pixels in a sub-scanning direction and perform an interpolation operation for pixels in a primary scanning direction.

The spatial filter process section 27 accepts the digital signal (CMYK) outputted from the zoom process section 26, corrects the textistic of spatial frequency by carrying out a spatial filtering process for the accepted digital signal and outputs a processed digital signal (CMYK) to the output tone correction section 28. The spatial filter process section 27 accepts the segmentation class signal outputted from the segmentation process section 23 and executes a spatial filtering process with reference to the accepted segmentation class signal.

As a result, it becomes possible to reduce blurring or graininess degradation of an image that should be outputted. An example of the spatial filtering process is an edge enhancement process to emphasize the outline of a text or a lowpass filtering process to remove an input halftone component.

The output tone correction section 28 accepts the digital signal (CMYK) outputted from the spatial filter process section 27, executes an output tone correction process to generate a halftone dot region ratio on the basis of a density signal and outputs the accepted digital signal to the tone reproduction process section 29.

The tone reproduction process section 29 accepts the digital signal (CMYK) outputted from the output tone correction section 28, and carries out the following tone reproduction process to the accepted digital signal. The tone reproduction process section 29 stores the processed digital signal (CMYK) in a storage device (not illustrated). The tone reproduction process section 29 reads out the digital signal from the storage device and outputs the read digital signal to the image output device 3, when the tone reproduction section 29 accepts An output instruction. The image output device 3 accepts the digital signal (CMYK) that is outputted from the tone reproduction process section 29, and outputs the accepted digital signal onto a recording medium such as a paper. The tone reproduction process section 29 also executes a tone reproduction process with reference to the segmentation class signal outputted from the:segmentation process section 23. It will be described later about a configuration and a function of the tone reproduction process section 29.

For example, when it is outputted a segmentation class signal that represents a text region, the spatial filter process section 27 emphasizes a high frequency component in an edge enhancement process of a spatial filter process, so as to improve the reproducibility of a text region of an image. At the same time, the tone reproduction process section 29 that has accepted the signal executes a binarization process or a multi-level dithering process using a high-resolution screen suitable for reproduction of the high-frequency content.

When it is outputted a segmentation class signal that represents a halftone dot region, the spatial filter process section 27 which has accepted the signal executes a lowpass filtering process, so as to remove an input halftone dot component of an image. The output tone correction section 28 executes an output tone correction process to generate a halftone dot region ratio being set in the image output device 3 on the basis of a density signal. Then, the tone reproduction process section 29 that has accepted the signal separates an image into each pixel, and executes a tone reproduction process, i.e. a halftone process, to reproduce the image in halftone.

When it is outputted a segmentation class signal that represents a photograph region, the tone reproduction process section 29 that has accepted the signal executes a binarization process or a multi-level dithering process using a screen that optimizes an tone reproduction.

Figure 2:
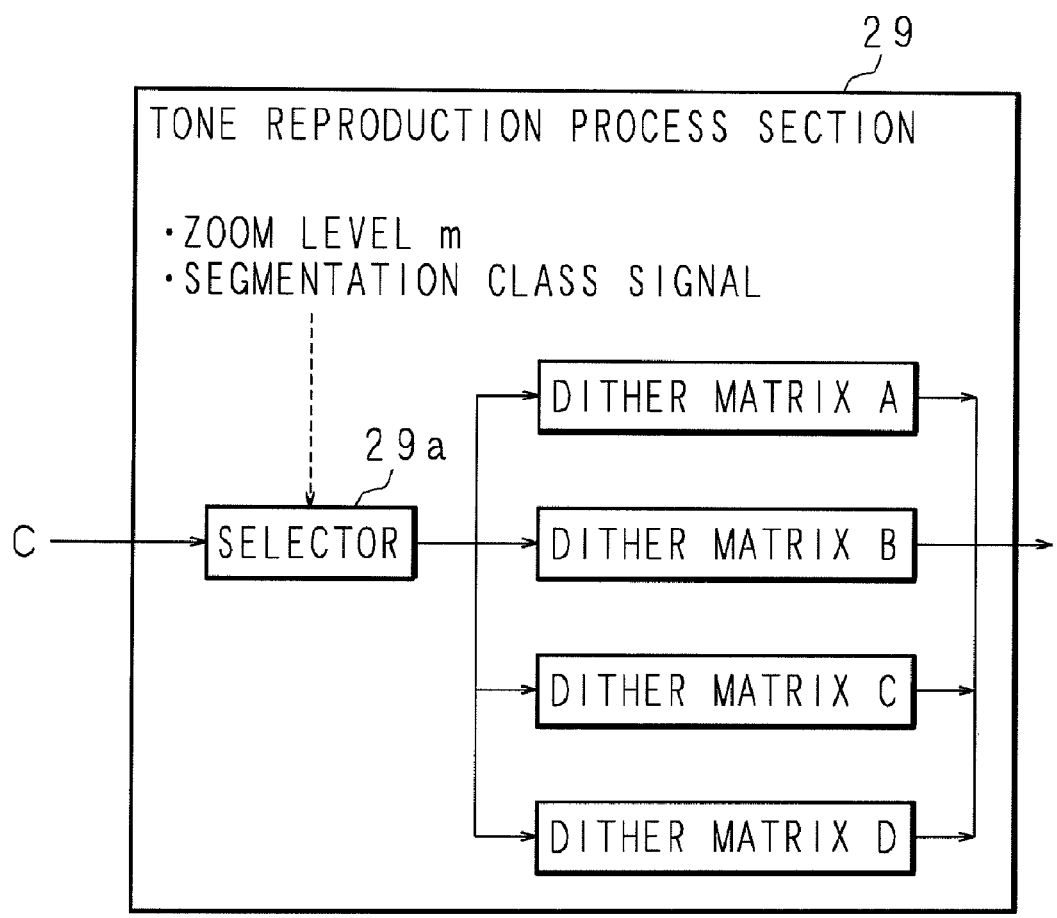
FIG. 2 is a block diagram for showing a structure of a tone reproduction process section.
Figure 4A:
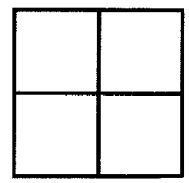
FIGS. 4A and 4B are conceptual views for explaining a dither matrix A.
Figure 4B:
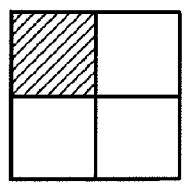
Figure 4B:
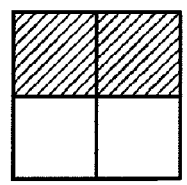
Figure 4B:
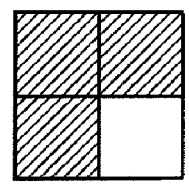
Figure 4B:
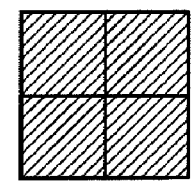
Figure 5A:
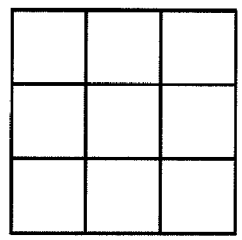
FIGS. 5A and 5B are conceptual views for explaining a dither matrix B.
Figure 5B:
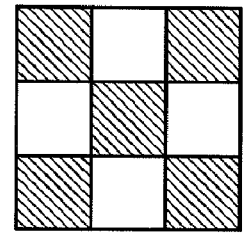
Figure 5B:
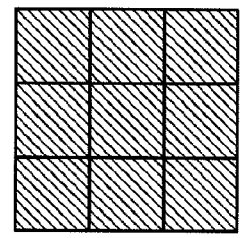
Figure 5B:
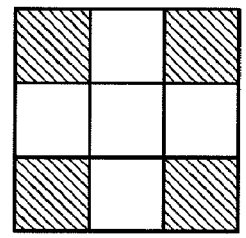
Figure 5B:
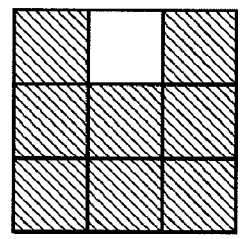
Figure 5B:
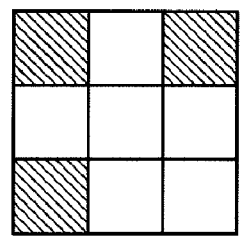
Figure 5B:
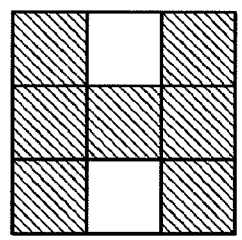
Figure 5B:
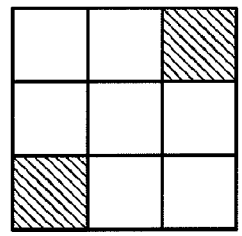
Figure 5B:
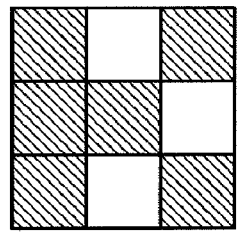
Figure 5B:
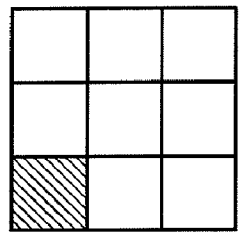
Figure 6A:
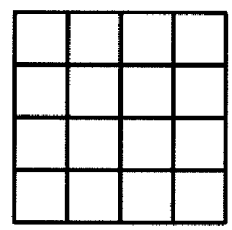
FIGS. 6A and 6B are conceptual views for explaining a dither matrix C.
Figure 6B:
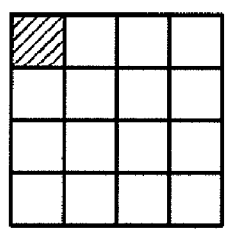
Figure 6B:
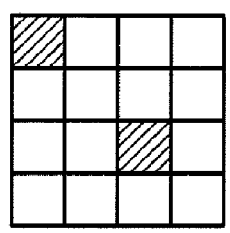
Figure 6B:
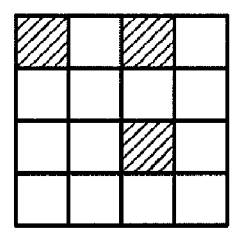
Figure 6B:
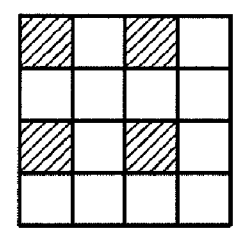
Figure 6B:
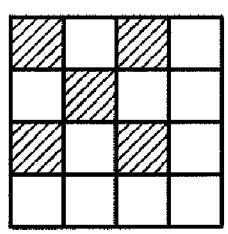
Figure 6B:
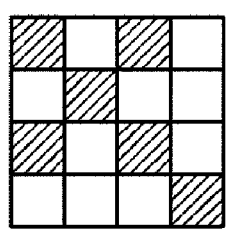
Figure 6B:
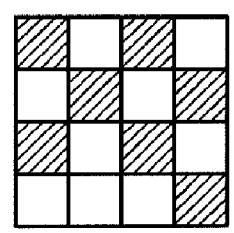
Figure 6B:
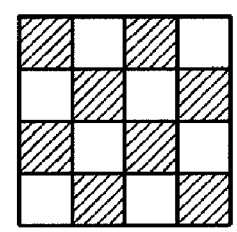
Figure 6B:
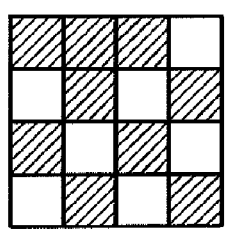
Figure 6B:
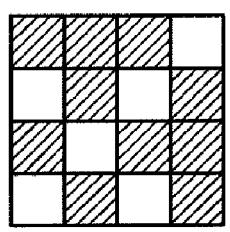
Figure 6B:
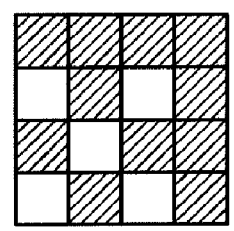
Figure 6B:
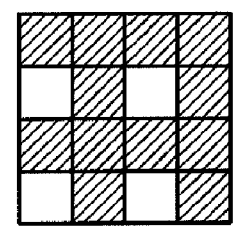
Figure 6B:
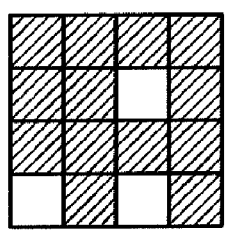
Figure 6B:
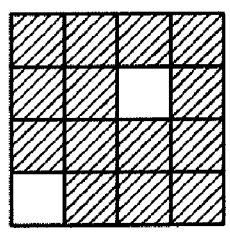
Figure 6B:
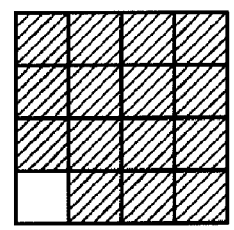
Figure 6B:
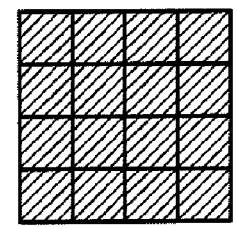

The following description will explain the configuration and the function of the tone reproduction process section 29. FIG. 2 is a block diagram for showing the structure of the tone reproduction process section 29. FIG. 3 is a schematic view for showing an example of storage in a selection table. FIGS. 4A and 4B are conceptual views for explaining a dither matrix A. FIGS. 5A and 5B are conceptual view s for explaining a dither matrix B. FIGS. 6A and 6B are conceptual views for explaining a dither matrix C.

The tone reproduction process section 29 is composed of a selector 29a and a storage section (not illustrated), and the storage section stores a plurality of dither matrices A, B, C and D. The selector 29a accepts a digital signal (C) that is outputted from the output tone correction section 28, and accepts the zoom level m outputted from the zoom process section 26 and the segmentation class signal that is outputted from the segmentation process section 23. The selector 29a executes a matrix selection process, which will be described later, so as to select and decide the most suitable dither matrix from the dither matrices A to D depending on the accepted zoom level m and segmentation class signal.

A selection table T1 associates a zoom level m with a dither matrix (see FIG. 3). The selection table T1 is prestored in the storage section. For example, the selection table T1 associates a zoom level m that is smaller than or equal to 50 (%) with the dither matrix A that has 300 (line per inch; LPI), a zoom level m that is larger than 50 (%) and smaller than 200 (%) with the dither matrix B that has 200 (LPI), and a zoom level m that is larger than or equal to 200 (%) with the dither matrix C that has 150 (LPI).

The dither matrix A is provided with 2×2 elements (see FIG. 4A) and each element represents a threshold level. When a halftone process is executed using the dither matrix A, an image is reproduced in four dot patterns (see FIG. 4B).

The dither matrix B is provided with 3×3 elements (see FIG. 5A) and each element represents a threshold level. When a halftone process is executed using the dither matrix B, an image is reproduced in nine dot patterns (see. FIG. 5B).

The dither matrix C is provided with 4×4 elements (see FIG. 6A) and each element represents a threshold level. When a halftone process is executed using the dither matrix C, an image is reproduced in sixteen dot patterns (see FIG. 6B).

The dither matrix D is provided with a predetermined number of elements, and the number is set preliminarily (not illustrated).

The description of Embodiment 1 explains an example that the dither matrices A to D are used for binarizing an image. However, the present invention is not limited to this. The dither matrices A to D may be used for performing a multi-level dithering process for an image.

Figure 7:
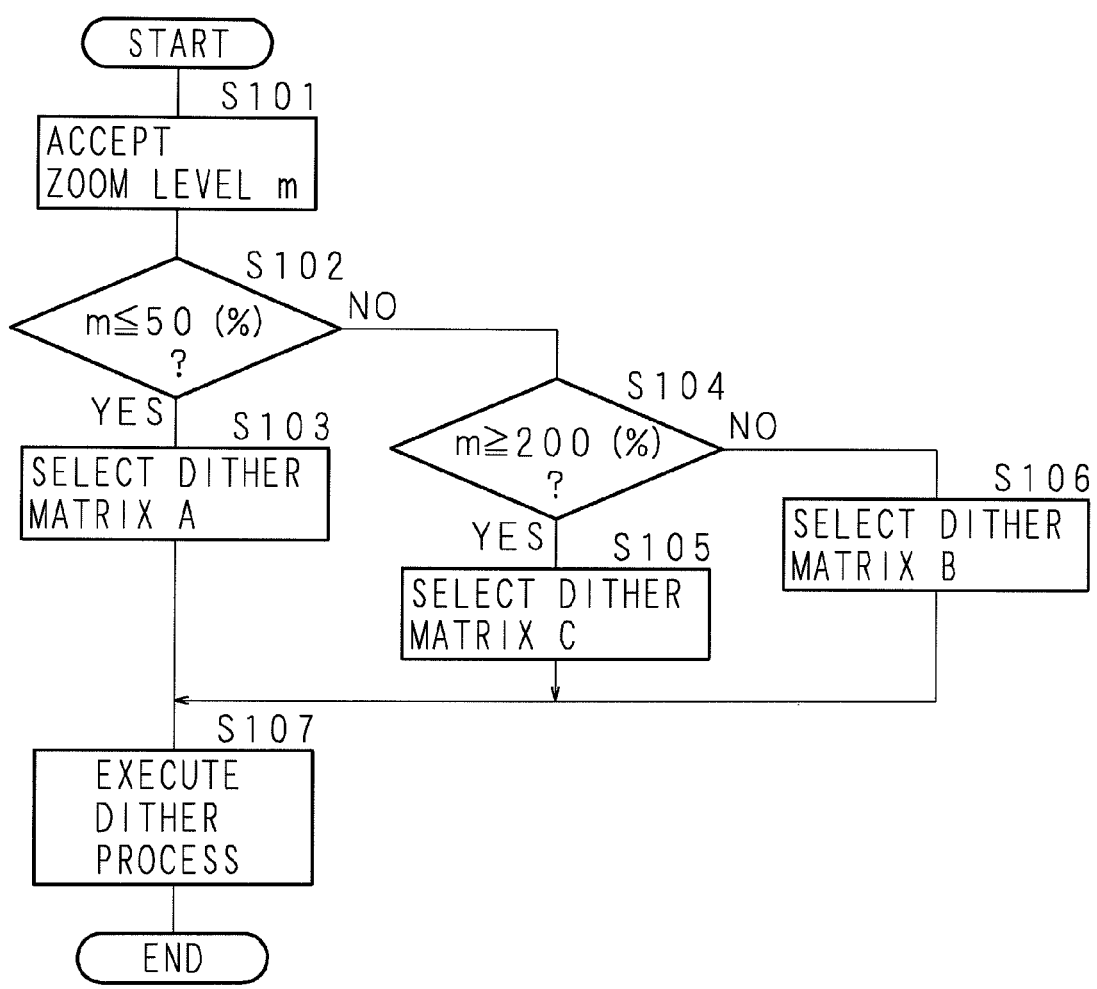
FIG. 7 is a flow chart for showing a procedure of a matrix selection process executed by a tone reproduction process section.

The following description will explain a procedure of the matrix selection process to be executed by the tone reproduction process section 29 in the image processing apparatus 2. FIG. 7 is a flow chart for showing the procedure of a matrix selection process executed by the tone reproduction process section 29.

Usually, it is selected a dither matrix that generally satisfies a condition for a detail reproducibility (resolution), a graininess and a tone. It is assumed hereinafter that a standard dither matrix has 200 (LPI), which corresponds to the dither matrix B.

When a halftone process is carried out With a low-resolution dither matrix to reduce dramatically an output size of an image, a text or a symbol of the image is reduced and becomes unreadable. In view of this fact, when the output size of an image is reduced, it is defined to select a dither matrix that has high-resolution of 300 (LPI), which corresponds to the dither matrix A.

When the output size of an image is drastically enlarged, it causes an image degradation by emphasis of poor graininess and tone. In view of this fact, it is defined to select a dither matrix that has low-resolution of 150 (LPI), which corresponds to the dither matrix C.

The tone reproduction process section 29 in the image processing apparatus 2 accepts a zoom level m outputted from the zoom process section 26 (S101) and judges whether the accepted zoom level m is lower than or equal to 50 (%) or not (S102). When judging that the accepted zoom level m is lower than or equal to 50 (%) (YES in S102), the tone reproduction process section 29 selects the dither matrix A from a plurality of dither matrices stored in the storage section (S103) and reads out the selected dither matrix A from the storage section. The tone reproduction process section 29 executes a tone reproduction process, i.e. a dither process, using the read dither matrix A (S107). Therefore, the tone reproduction process section 29 performs binarization process using a high-resolution screen and completes the process.

On the other hand, when judging in the step S102 that the accepted zoom level m is larger than 50 (%) (NO in S102), the tone reproduction process section 29 judges whether the accepted zoom level m is larger than or equal to 200 (%) or not (S104). When judging that the accepted zoom level m is larger than or equal to 200 (%) (YES in S104), the tone reproduction process section 29 selects the dither matrix C from a plurality of dither matrices stored in the storage section (S105) and reads out the selected dither matrix C from the storage section. The tone reproduction process section 29 executes a dither process using the read dither matrix C (S107), performs a binarization process using a screen that emphasizes the tone reproducibility, and completes the process.

On the other hand, hen judging in the step S104 that the accepted zoom level m is smaller than 200 (%) (NO in S104), the tone reproduction process section 29 selects the dither matrix B from a plurality of dither matrices stored in the storage section (S106) and reads out the selected dither matrix B from the storage section. The tone reproduction process section 29 executes a dither process using the read dither matrix B (S107), performs a binarization process using a standard screen and completes the process. The zoom level m that is used to select a dither matrix may be associated with a dither matrix to obtain suitable image for various image data.

Figure 8:
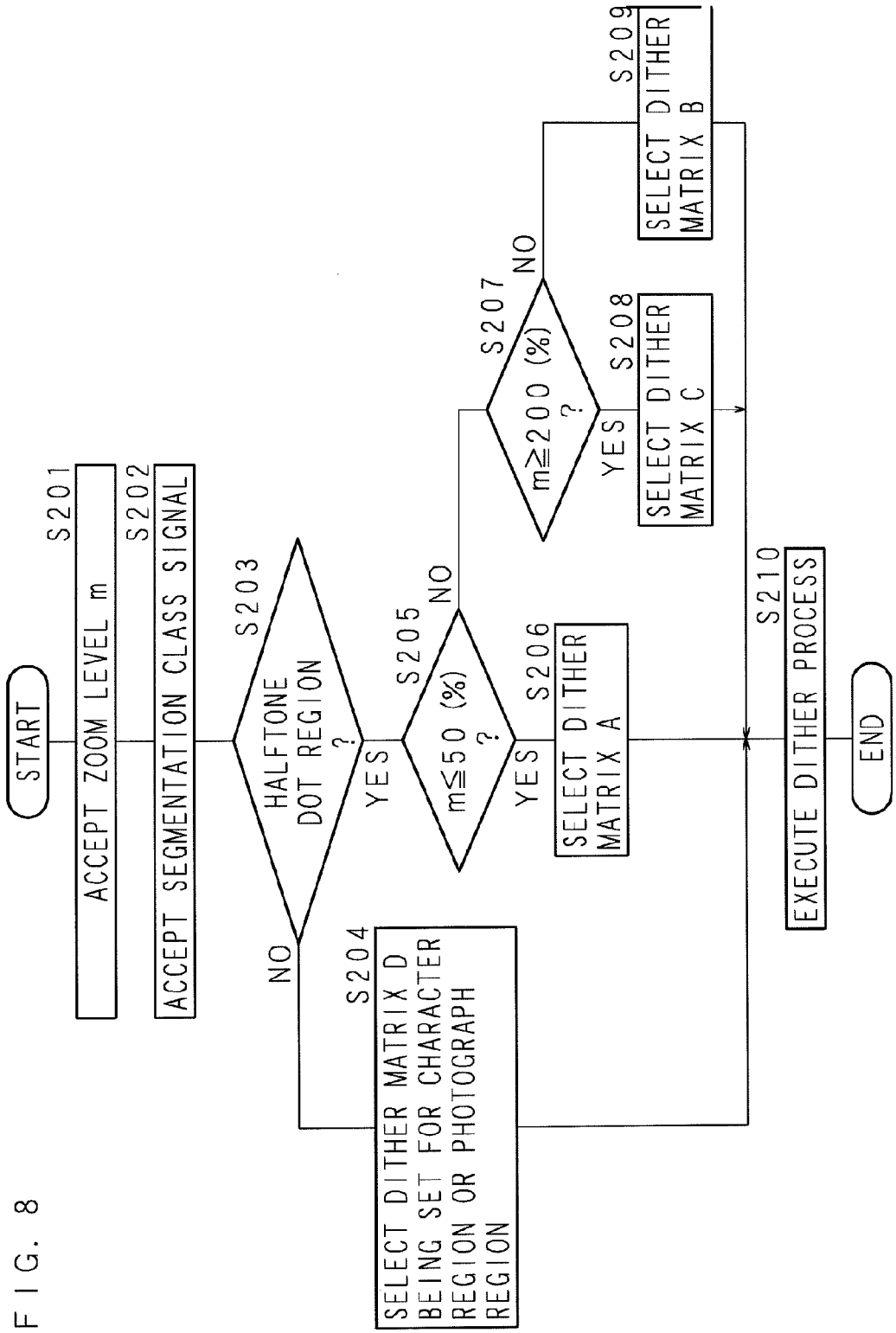
FIG. 8 is a flow chart for showing a procedure of a matrix selection process based on a region, which is executed by the tone reproduction process section.

The following description will explain a procedure of a matrix selection process based on a region that the tone reproduction process section 29 in the image processing apparatus 2 executes. FIG. 8 is a flow chart for showing the procedure of a matrix selection process based on a region, which is executed by the tone reproduction process section 29.

When the segmentation process section 23 judges that the region belongs to a halftone dot region, a dither matrix having an LPI is selected based on a zoom level. Even when the size of a halftone text or a text on halftone dot area is set to reproducible 12 point, the halftone dot text or the like is reduced to 6 point and caused to decline in reproducibility as the output size of an image including the halftone dot text or the like is reduced to 50 (%). In view of this fact, the image processing apparatus 2 selects only for a halftone dot region a dither matrix having the most suitable resolution (LPI), and then restrains image degradation.

The tone reproduction process section 29 in the image processing apparatus 2 accepts a zoom level m outputted from the zoom process section 26 (S201) and accepts a segmentation class signal outputted from the segmentation process section 23 (S202). The tone reproduction process section 29 judges whether the accepted segmentation class signal indicates a halftone dot region or not (S203). The tone reproduction process section 29 selects a dither matrix D that is set for a text region or a photograph region (S204), when judging that the accepted segmentation class signal does not indicate a halftone dot region (NO in S203).

For example, when judging that the segmentation class signal indicates a text region, the tone reproduction process section 29 selects a dither matrix that is suitable for reproduction of a text to prevent shaggy. The tone reproduction process section 29 reads out the selected dither matrix from the storage section. In this case, it selects a dither matrix having 300 (LPI), without selecting a dither matrix based on the output size of an image.

When judging that the segmentation class signal indicates a photograph region, the tone reproduction process section 29 selects a dither matrix that can grow dots in the order of pixels having higher tone and graininess. Then, the tone reproduction process section 29 reads out the selected dither matrix from the storage section. In this case, it selects a dither matrix having 150 (LPI) without selecting a dither matrix based on the output size of an image.

On the other hand, when Judging in the step S203 that the segmentation class signal indicates a halftone dot region (YES in S203), the tone reproduction process section 29 judges whether a zoom level m accepted in the step S201 is smaller than or equal to 50 (%) or not (S205). When judging that the accepted zoom level m is smaller than or equal to 50 (%) (YES in S205), the tone reproduction process section 29 selects the dither matrix A from a plurality of dither matrices stored in the storage section (S206) and reads out the selected dither matrix A from the storage section. The tone reproduction process section 29 executes a dither process using the read dither matrix A (S210), performs a binarization process using a high-resolution screen, and completes the process.

On the other hand, when judging that the zoom level m accepted in the step S201 is larger than 50 (%) (NO in S205), the tone reproduction process section 29 judges whether the accepted zoom level m is larger than or equal to 200 (%) or not (S207). When judging that the accepted zoom level m is larger than or equal to 200 (%) (YES in S207), the tone reproduction process section 29 selects the dither matrix C from a plurality of dither matrices stored in the storage section (S208), and reads out the selected dither matrix C from the storage section. The tone reproduction process section 29 executes a dither process using the read dither matrix C (S210), performs a binarization process using a screen that emphasizes the tone reproducibility, and completes the process.

On the other hand, when judging in the step S207 that the accepted zoom level m is smaller than 200 (%) (NO in S207), the tone reproduction process section 29 selects the dither matrix B from a plurality of dither matrices stored in the storage section (S209) and reads out the selected dither matrix B from the storage section. The tone reproduction process section 29 executes a dither process using the read dither matrix B (S210), performs a binarization process using a standard screen and completes the process.

The following description will explain the procedure of a segmentation process that the segmentation process section 23 in the image processing apparatus 2 executes. The segmentation process uses an image processing method described in Japanese Patent Application Laid-Open No. 2002-232708 which is applied by the present applicant, for example. The following description will give brief description of the method.

The segmentation process section 23 calculates a delta maximum density difference between a minimum density value and a maximum density value in a block (e.g., 15×15 pixels) that is composed of a plurality of pixels and comprises a target pixel. The segmentation process section 23 further calculates a sum density busyness that is the sum of absolute values of density differences of adjacent pixels. The segmentation process section 23 compares the calculated maximum density difference and sum density busyness with preset thresholds, and then separates the target pixel into a group of a page background region and a photographic-picture region. It means that the segmentation process section 23 separates the target pixel into a continuous tone region such as photographic-picture and a group of a text edge region and a halftone dot region on the basis of the result of comparison.

The segmentation process section 23 refers to the following feature quantity for separating a region.

First, in density distribution for a page background region, both of the maximum density difference and the sum density busyness are usually small since the density change is small.

Second, in density distribution for a photographic-picture region, the density change is smooth and both of the maximum density difference and the sum density busyness are small but slightly larger than those of a page background region.

Third, in density distribution for a halftone dot region, a ratio of a sum density busyness corresponding to the maximum density difference becomes large when the sum density busyness shows a density change depending on the number of halftone dots, although the maximum density difference is not constant since there are a variety of halftone dot modes. Accordingly, when the sum density busyness is larger than the product of the maximum density difference and a threshold for judgment of a text region and a halftone dot region, it can be judged that a pixel is a halftone dot pixel.

Fourth, in density distribution for a text region, the sum density busyness becomes smaller than that of a halftone dot region since a density change is smaller than that of a halftone dot region, although the maxim density difference becomes large and then the sum density busyness becomes large. Accordingly when the sum density busyness is smaller than the product of the maximum density difference and the threshold for judgment of a text region and a halftone dot region, it can be judged that a pixel is a text edge region.

The segmentation process section 23 executes a following procedure for separating a region. The segmentation process section 23 compares the calculated maximum density difference with a threshold of the sum density busyness. When the maximum density difference is smaller than the threshold of a maximum density difference and the sum density busyness is smaller than the threshold of a sum density busyness (satisfying two conditions), it is judged that the target pixel is a page background region or photographic-picture region. On the other hand, when it does not satisfy the two conditions, the segmentation process section 23 judges that the target pixel is a text region or halftone dot region.

When judging that the target pixel is a page background region or photographic-picture region, the segmentation process section 23 further compares the calculated maximum density difference with a threshold for judgment of a page background region and photographic-picture region. When it is judged as a result of comparison that the maximum density difference is smaller than the threshold for judgment of a page background region and photographic-picture region, it is judged that the target pixel is a page background region. On the other hand, when judging that the maximum density difference is larger than the threshold for judgment of a page background region and photographic-picture region, the segmentation process section 23 judges that the target pixel is a photographic-picture region.

When judging that the target pixel is a text region or a halftone dot region, the segmentation process section 23 compares the calculated sum density busyness with the product of the maximum density difference and the threshold for judgment of a text region and halftone dot region. When the sum density busyness is smaller than the product, it is judged that the target pixel is a text edge region. On the other hand, when the sum density busyness is larger than the product, the segmentation process section 23 judges that the target pixel is a halftone dot region.

It should be noted that the description of Embodiment 1 explains an example in which the segmentation process section 23 separates a target pixel into a text region, a halftone dot region, a photographic-picture region or a page background region. However, the present invention is not limited to this. The segmentation process section 23 may separate a target pixel into a text region, a halftone dot region or the other region (photographic-picture region and page background region).

(Embodiment 2)

Figure 9:
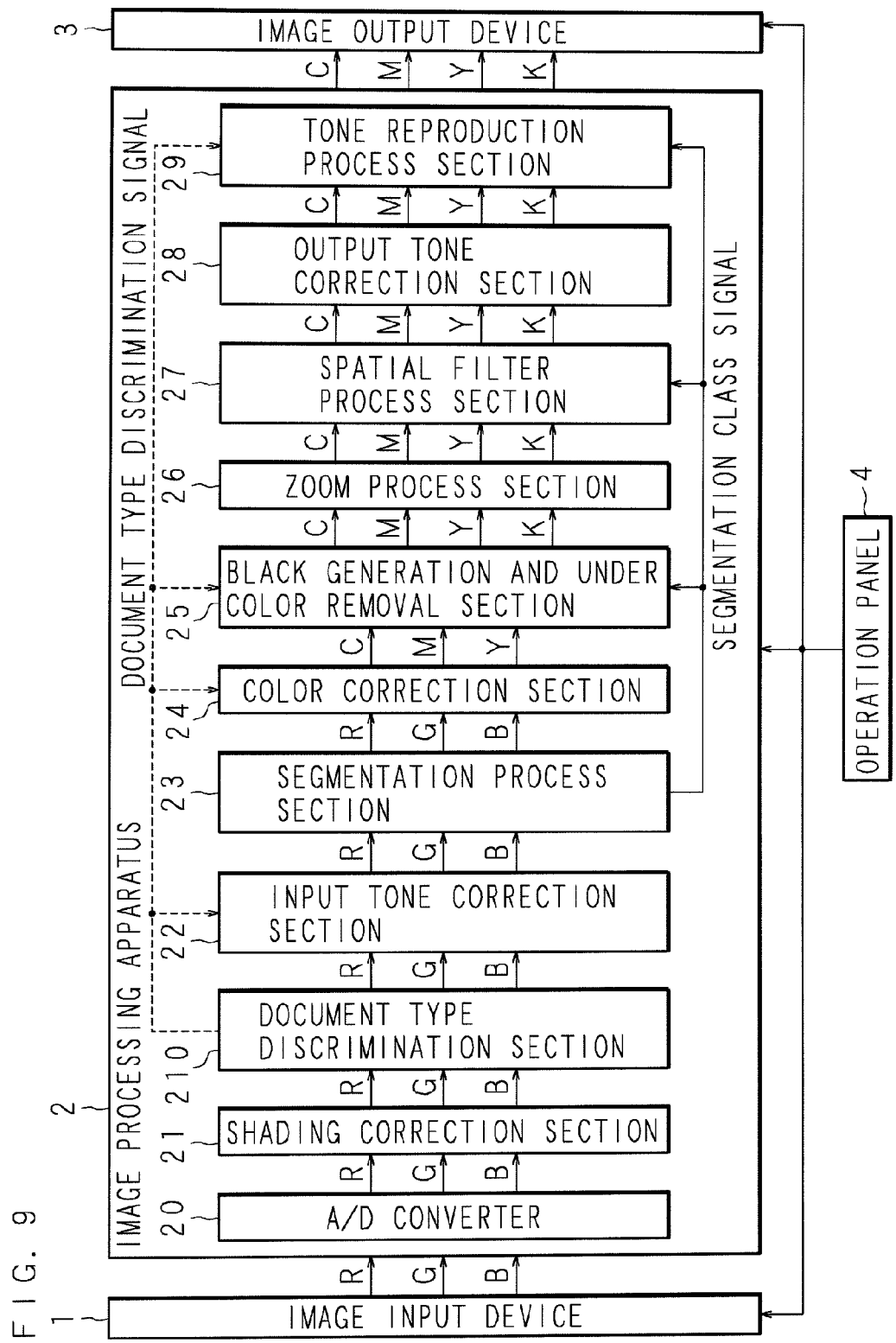
FIG. 9 is a block diagram for showing an entire structure of an image forming system including an image processing apparatus according to Embodiment 2.

The description of Embodiment 1 explains an example of selection of a dither matrix having a predetermined LPI depending on a zoom level or selection of a dither matrix having an LPI based on a zoom level regarding a region that is judged to be a halftone dot region by the segmentation process section 23. However, the present invention is not limited to this. A dither matrix having a predetermined LPI may be selected depending on the document type. In view of this fact, the description of Embodiment 2 will explain an example in which the image processing apparatus 2 is provided with a function for discriminating the document type of inputted image data. It should be noted that the description of Embodiment 2 explains an example in which the image forming system is a digital color complex machine. FIG. 9 is a block diagram for showing the entire structure of an image forming system comprising an image processing apparatus according to Embodiment 2.

The image forming system in the figure is composed of an image input device 1, an image processing apparatus 2, an image output device 3 and an operation panel 4.

It should be noted that the image input device 1, the image output device 3 and the operation panel 4 are the same as those of Embodiment 1 and explanation of the structure and the function thereof will be omitted.

The image processing apparatus 2 is composed of an A/D converter 20, a shading correction section 21, an input tone correction section 22, a segmentation process section 23, a color correction section 24, a black generation and under color removal section 25, a zoom process section 26, a spatial filter process section 27, an output tone correction section 28, a tone reproduction process section 29 and a document type discrimination section 210. A CPU (Central Processing Unit) (not illustrated) or a DSP (Digital Signal Processor) (not illustrated) controls the respective hardware in the image processing apparatus 2.

The A/D converter 20 converts an RGB analog signal accepted from the image input device 1 into a digital signal and outputs the digital signal obtained by A/D conversion to the shading correction section 21.

The shading correction section 21 accepts the digital signal outputted from the A/D converter 20, executes the same process as that of Embodiment 1 for the accepted digital signal and outputs a processed digital signal to the document type discrimination section 210.

The document type discrimination section 210 accepts the digital signal outputted from the shading correction section 21 and discriminates the document type of an inputted image as a text document, a printed-picture document or a text printed-picture document that consists of a text and printed-picture, on the basis of the digital signal. The document type discrimination section 210 generates a document type discrimination signal depending on the result of discrimination and outputs the generated document type discrimination signal to the input tone correction section 22, the color correction section 24, the black generation and under color removal section 25, the spatial filter process section 27 and the tone reproduction process section 29. The document type discrimination section 210 also outputs the digital signal accepted from the shading correction section 21 to the input tone correction section 22.

The input tone correction section 22 accepts the digital signal outputted from the document type discrimination section 210, carries out removal of the page background density or an image quality gradation process of contrast or the like for the accepted digital signal, and outputs a processed digital signal to the segmentation process section 23. The input tone correction section 22 also accepts the document type discrimination signal outputted from the document type discrimination section 210 and executes input tone correction with reference to the accepted document type discrimination signal.

The segmentation process section 23 accepts the digital signal outputted from the input tone correction section 22 and executes the same process as that of Embodiment 1 on the basis of the accepted digital signal. The segmentation process section 23 outputs a processed digital signal to the color correction section 24. The segmentation process section 23 also generates a segmentation class signal in the same manner as that of Embodiment 1 and outputs the generated segmentation class signal to the black generation and under color removal section 25, the spatial filter process section 27 and the tone reproduction process section 29.

The color correction section 24 accepts the digital signal outputted from the segmentation process section 23 and executes the same process as that of Embodiment 1 for the accepted digital signal. The color correction section 24 outputs a processed digital signal to the black generation and under color removal section 25. The color correction section 24 also accepts the document type discrimination signal outputted from the document type discrimination section 210 and executes color correction with reference to the accepted document type discrimination signal.

The black generation and under color removal section 25 accepts the digital signal outputted from the color correction section 24 and executes the same process as that of Embodiment 1 for the accepted digital signal. The black generation and under color removal section 25 outputs a processed digital signal to the zoom process section 26. The black generation and under color removal section 25 also accepts the document type discrimination signal outputted from the document type discrimination section 210 and the segmentation class signal outputted from the segmentation process section 23 and executes a black generation under color removal process with reference to the accepted document type discrimination signal and segmentation class signal.

The zoom process section 26 accepts the digital signal outputted from the black generation and under color removal section 25 and executes the same process as that of Embodiment 1 for an image indicated by the accepted digital signal. The zoom process section 26 outputs a processed digital signal to the spatial filter process section 27.

The spatial filter process section 27 accepts the digital signal outputted from the zoom process section 26 and executes the same process as that of Embodiment 1 for the accepted digital signal. The spatial filter process section 27 outputs a processed digital signal to the output tone correction section 28. The spatial filter process section 27 also accepts the document type discrimination signal outputted from the document type discrimination section 210 and the segmentation class signal outputted from the segmentation process section 23 and executes a spatial filtering process with reference to the accepted document type discrimination signal and segmentation class signal.

The output tone correction section 28 accepts the digital signal outputted from the spatial filter process section 27 and executes the same process as that of Embodiment 1 on the basis of a density signal. The output tone correction section 28 outputs a processed digital signal to the tone reproduction process section 29.

The tone reproduction process section 29 accepts the digital signal outputted from the output tone correction section 28 and executes the same process as that of Embodiment 1 for the accepted digital signal. The tone reproduction process section 29 stores a processed digital signal in a storage device and outputs the signal to the image output device 3 at predetermined timing. The tone reproduction process section 29 also accepts the document type discrimination signal outputted from the document type discrimination section 210 and the segmentation class signal outputted from the segmentation process section 23 and executes a tone reproduction process with reference to the accepted document type discrimination signal and segmentation class signal. It should be noted that a structure and a function of the tone reproduction process section 29 according to Embodiment 2 will be described later.

Figure 10:
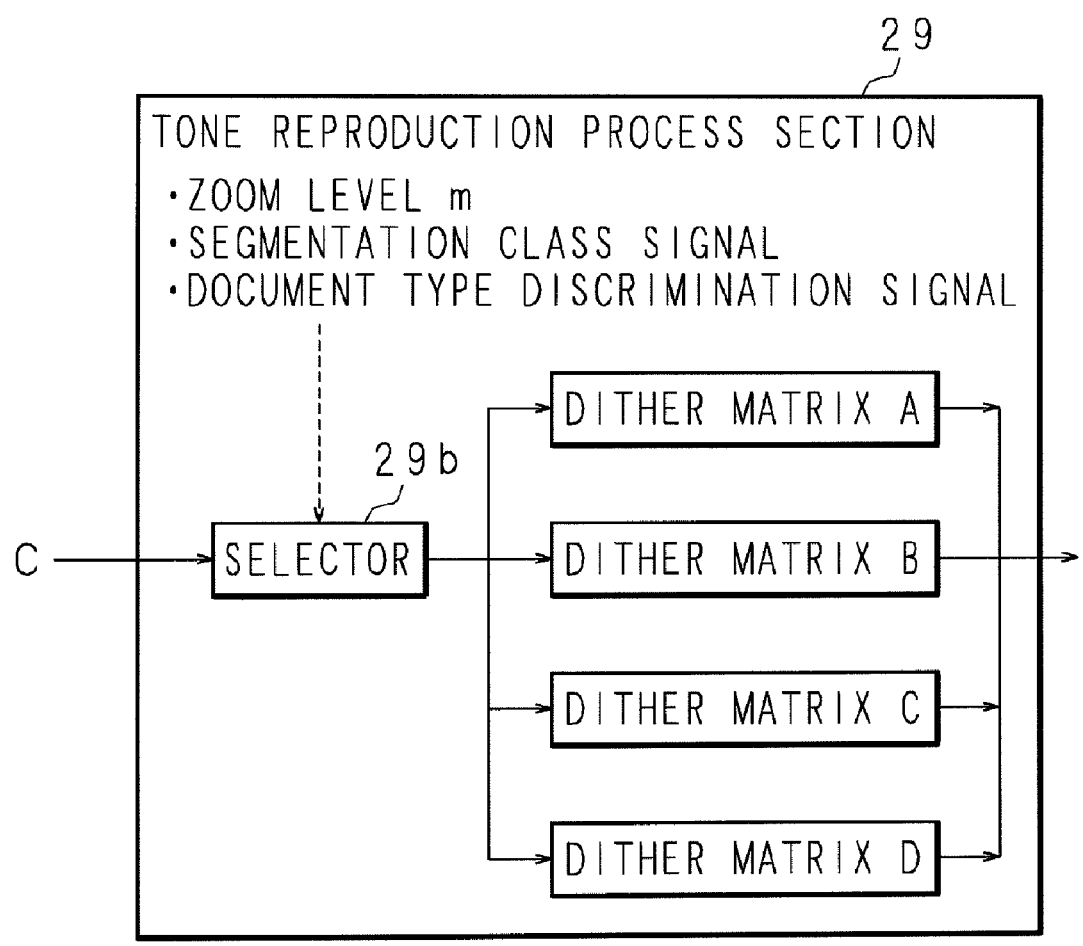
FIG. 10 is a bock diagram for showing a structure of a tone reproduction process section according to Embodiment 2.

The following description will explain the structure and the function of the tone reproduction process section 29 according to Embodiment 2. FIG. 10 is a bock diagram for showing the structure of the tone reproduction process section 29 according to Embodiment 2. FIG. 11 is a schematic view for showing an example of storage in a selection table according to Embodiment 2.

The tone reproduction process section 29 is composed of a selector 29b and a storage section, and the storage section stores a plurality of dither matrices A, B, C and D. The tone reproduction process section 29 accepts a digital signal (C) outputted from the output tone correction section 28 and accepts a zoom level m outputted from the zoom process section 26, a segmentation class signal outputted from the segmentation process section 23 and a document type discrimination signal outputted from the document type discrimination section 210. The selector 29b executes a matrix selection process based on the document type, which will be described later, so as to select-and-decide the most suitable dither matrix from the dither matrices A to D depending on the accepted zoom level m and document type.

A selection table T2 associates a zoom level m and a document type with a dither matrix (see FIG. 11). The selection table T2 is prestored in the storage section. The selection table T2 associates a zoom level m and a document type with a dither matrix in a field where it crosses the row of the zoom level m and the column of the document type.

When a zoom level m is smaller than or equal to 50 (%) for example, the selection table T2 associates a text document with the dither matrix A having 300 (LPI), a photographic-picture document or a text photographic-picture document with the dither matrix C having 150 (LPI), and a printed-picture document or a text printed-picture document with the dither matrix A having 300 (LPI).

When a zoom level m is larger than 50 (%) and smaller than 200 (%), the selection table T2 associates a text document with the dither matrix A having 300 (LPI), a photographic-picture document or a text photographic-picture document with the dither matrix C having 150 (LPI) and a printed-picture document or a text printed-picture document with the dither matrix B having 200 (LPI).

When a zoom level m is larger than or equal to 200 (%), the selection table T2 associates a text document with the dither matrix A having 300 (LPI), a photographic-picture document or a text photographic-picture document with the dither matrix C having 150 (LPI) and a printed-picture document or a text printed-picture document with the dither matrix C having 150 (LPI).

It should be noted that the dither matrices A, B, C and D are the same as those of Embodiment 1 and detailed explanation thereof will be omitted.

Figure 12:
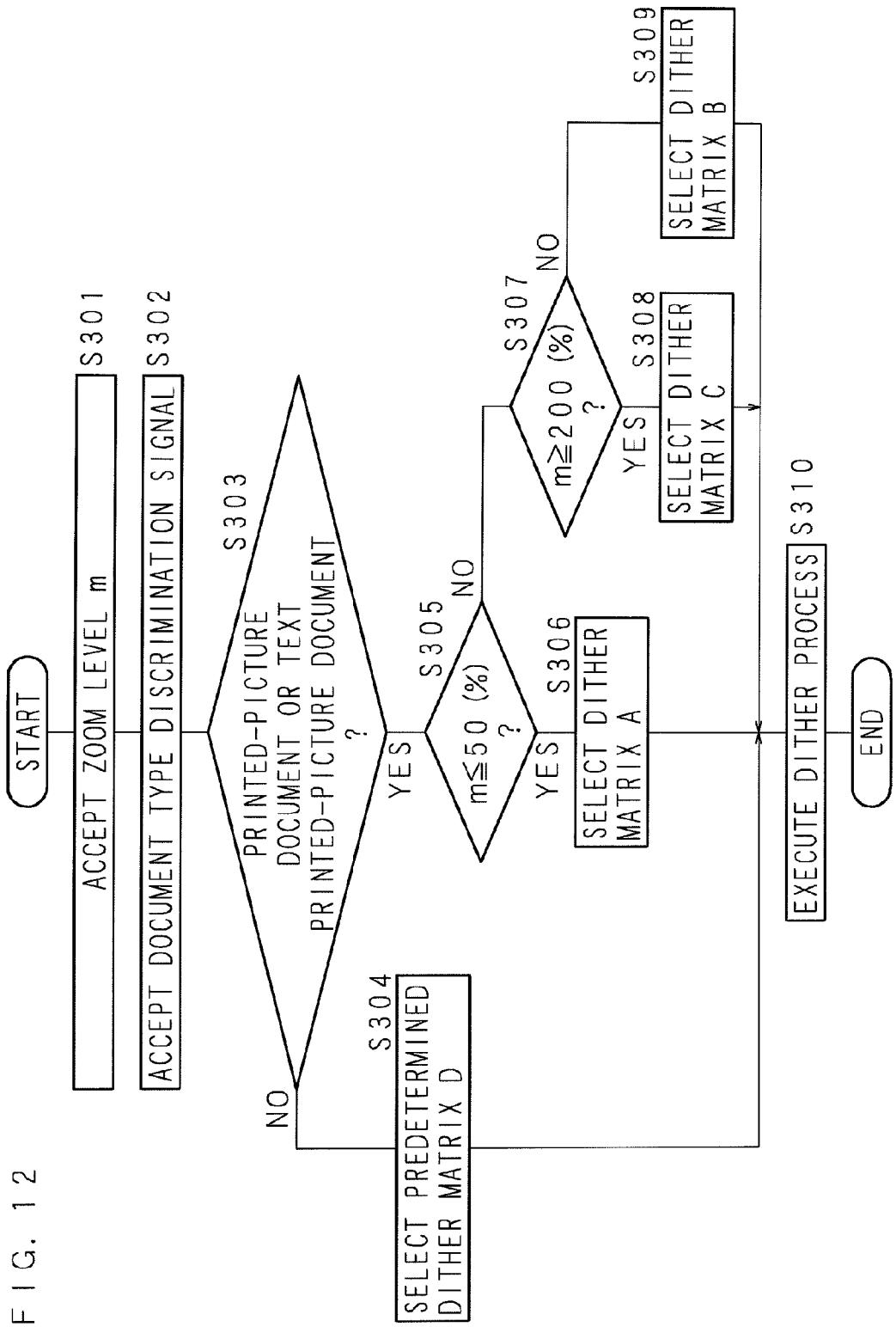
FIG. 12 is a flow chart for showing a procedure of a matrix selection process based on an image type according to Embodiment 2.

The following description will explain the procedure of a matrix selection process based on the document type that the tone reproduction process section 29 in the image processing apparatus 2 executes. FIG. 12 is a flow chart for showing a procedure of a matrix selection process based on the document type according to Embodiment 2.

The tone reproduction process section 29 selects a dither matrix having an LPI based on a zoom level m for an image which is judged to be a printed-picture document or a text printed-picture document by a document type discrimination process that will be described later. Here, a printed-picture document means a photograph region or page background region composed of halftone dots. Even when the size of a halftone text or a text on halftone dot area is set to reproducible 12 point, the halftone dot text or the like is reduced to 6 point and caused to decline in reproducibility as the output size of an image including the halftone dot text or the like is reduced to 50 (%). In view of this fact, the tone reproduction process section 29 restrains image degradation by selecting a dither matrix having the most suitable LPI for an original including printed-picture (see FIG. 11).

The tone reproduction process section 29 does not select a dither matrix having an LPI based on the zoom level m for an image which is judged later to be a text document, a photographic-picture document or a text photographic-picture document by the document type discrimination process that will be described later (see FIG. 11). It should be noted that the description of Embodiment 2 explains an example in which the dither matrix A having 300 (LPI) is associated with a text document and the dither matrix C having 150 (LPI) is associated with a photographic-picture document or a text photographic-picture document. However, the present invention is not limited to this. The dither matrix B having 200

(LPI) may be used for a text document, a photographic-picture document or a text photographic-picture document.

The tone reproduction process section 29 in the image processing apparatus 2 accepts a zoom level m outputted from the zoom process section 26 (S301) and accepts a document type discrimination signal outputted from the document type discrimination section 210 (S302). The tone reproduction process section 29 judges whether the accepted document type discrimination signal indicates a printed-picture document or a text printed-picture document or not (S303), and selects a dither matrix D (S304), which is preset for a printed-picture document or a text printed-picture document, when the accepted document type discrimination signal does not indicate any one of the printed-picture document and the text printed-picture document (NO in S303).

On the other hand, when judging that the accepted document type discrimination signal indicates any one of the printed-picture document and the text printed-picture document (YES in S303), the: tone reproduction process section 29 judges whether the accepted zoom level m is smaller than or equal to 50 (%) or not (S305). When the accepted zoom level m is smaller than or equal to 50 (%) (YES in S305), the tone reproduction process section 29 selects the dither matrix A from a plurality of dither matrices stored in the storage section (S306) and reads out the selected dither matrix A from the storage section. The tone reproduction process section 29 executes a dither process using the read dither matrix A (S310), performs a binarization process using a high-resolution screen, and completes the process.

On the other hand, when the accepted zoom level m is larger than 50 (%) (NO in S305), the tone reproduction process section 29 judges whether the accepted zoom level m is larger than or equal to 200 (%) or not (S307). When the accepted zoom level m is larger than or equal to 200 (%) (YES in S307), the tone reproduction process section 29 selects the dither matrix C from a plurality of dither matrices stored in the storage section (S308) and reads out the selected dither matrix C from the storage section. The tone reproduction process section 29 executes a dither process using the read dither matrix C (S310), performs a binarization process using a screen that emphasizes the tone reproducibility, and completes the process.

On the other hand, when the accepted zoom level m is smaller than 200 (%) (NO in S307), the tone reproduction process section 29 selects the dither matrix B from a plurality of dither matrices stored in the storage section (S309), and reads out the selected dither matrix B from the storage section. The tone reproduction process section 29 executes a dither process using the read dither matrix B (S310), performs a binarization process using a standard screen, and completes the process.

The following description will explain the procedure of a segmentation process to be executed by the segmentation process section 23 in the image processing apparatus 2. The segmentation process uses an image processing method described in Japanese Patent Application Laid-Open No. 2002-232708 which is applied by the present applicant, for example. It should be noted that the method is the same as that of Embodiment 1 and detailed explanation thereof will be omitted.

The following description will explain a procedure of a document type discrimination process that the document type discrimination section 210 in the image processing apparatus 2 executes. The document type discrimination process uses the segmentation process described above to separate a page background region, a halftone dot region or a text region for a block composed of one or a plurality of pixels. The document type discrimination process then counts the number of separated blocks. The counted number of blocks is then compared with a preset threshold value for judgment of a page background region, a photographic-picture (continuous tone) region, a halftone dot region or a text region. The type of the entire image including the blocks is judged on the basis of the comparison result.

For example, when the ratio of a text region and the ratio of a halftone dot region are respectively larger than or equal to thresholds, the document type discrimination section 210 judges that the entire image is a text printed-picture document. It should be noted that the text printed-picture document here is a document composed of texts and halftone dots.

When the ratio of a text region is equal to or more than 30 (%) of the number of pixels of the entire image, the document type discrimination section 210 judges that the entire image is a text document.

When the ratio of a halftone dot region is equal to or more than 20 (%) of the number of pixels of the entire image, the document type discrimination section 210 judges that the entire image is a halftone dot document (printed-picture document).

When the ratio of a photographic-picture region is equal to or more than 10 (%) of the number of pixels of the entire image, the document type discrimination section 210 judges that the entire image is a photographic-picture document.

It should be noted that the description of Embodiment 2 explains an example of discrimination of the document type of an image which is preliminarily scanned by the image input device 1. However, the present invention is not limited to this. It may use an image which is scanned and then temporarily stored in an auxiliary storage device or the like.

Moreover, the description of Embodiment 2 explains an example in which the document type discrimination section 210 in the image processing apparatus 2 automatically executes a document type discrimination process. However, the present invention is not limited to this. The image processing apparatus 2 may accept an image mode inputted by the user through the operation panel 4 and judge that the document belongs to a type corresponding to the accepted image mode. In this case, the document type discrimination signal is generated at the CPU in the image processing apparatus 2.

(Embodiment 3)

Figure 13:
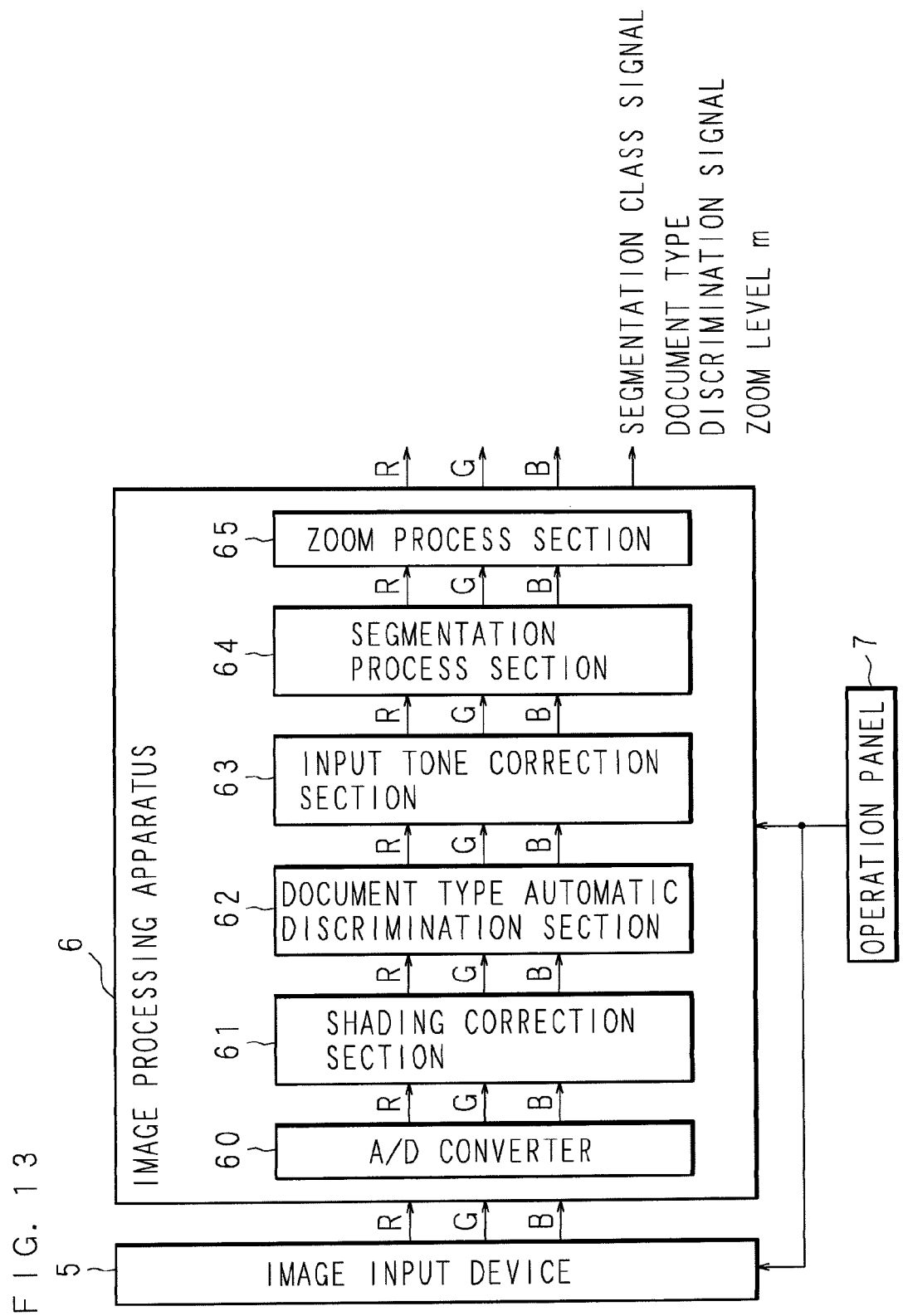
FIG. 13 is a block diagram for showing an entire structure of an image reading apparatus according to Embodiment 3.

The above description of Embodiments 1 and 2 explains an example in which the image processing apparatus 2 in the image forming system executes the document type discrimination process, the zoom process, the segmentation process, the matrix selection process and the halftone process. However, the present invention is not limited to this. An image reading apparatus may execute only the document type discrimination process, the zoom process and the segmentation process. The image reading apparatus is, for example, a flatbed scanner. FIG. 13 is a block diagram for showing the entire structure of an image reading apparatus according to Embodiment 3.

The image reading apparatus in the figure is composed of an image input device 5 and an image processing apparatus 6. The image input device 5 is, for example, a scanner provided with a CCD (Charged Coupled Device), which accepts reflected light from a document as an RGB analog signal and outputs the signal to the image processing apparatus 6. The image processing apparatus 6 carries out a process, which will be described later, for an accepted RGB analog signal. The image processing apparatus 6 then outputs the signal as a CMYK digital color signal to an external device.

The image processing apparatus 6 is composed of an A/D converter 60, a shading correction section 61, a document type automatic discrimination section 62, an input tone correction section 63, a segmentation process section 64 and a zoom process section 65. A CPU (Central Processing Unit) (not illustrated) or a DSP (Digital Signal Processor) (not illustrated) controls the respective hardware in the image processing apparatus 6.

The A/D converter 60 converts an RGB analog signal accepted from the image input device 5 into a digital signal and outputs the digital signal obtained by conversion to the shading correction section 61.

The shading correction section 61 accepts the digital signal outputted from the A/D converter 60 and performs a process for the accepted digital signal to remove various distortions caused by a lightning system, an image focusing system and an image sensing system of the image input device 5. The shading correction section 61 also converts an RGB reflectivity signal into a signal, such as a density signal, which is easy to handle for an image processing system provided to the color image processing device, performs a process to adjust color balance, and outputs a processed digital signal to the document type automatic discrimination section 62.

The document type automatic discrimination section 62 accepts the digital signal outputted from the shading correction section 61 and discriminates the document type of an inputted image as a text document, a printed-picture document or a text printed-picture document that consists of a text and printed-picture, on the basis of the digital signal. The document type automatic discrimination section 62 generates a document type discrimination signal depending on the result of discrimination and outputs the generated document type discrimination signal to outside. The document type automatic discrimination section 62 also outputs the digital signal accepted from the shading correction section 61 to the input tone correction section 63.

The input tone correction section 63 accepts the digital signal outputted from the document type automatic discrimination section 62, carries out removal of the page background density or an image quality gradation process of contrast or the like for the accepted digital signal, and outputs a processed digital signal to the segmentation process section 64.

The segmentation process section 64 accepts the digital signal outputted from the input tone correction section 63 and executes a segmentation process for separating an inputted image into any one of a text region, a halftone dot region and a photograph region on the basis of the accepted digital signal.

It should be noted that the segmentation process is the same as the segmentation process explained in the description of Embodiment 1 and detailed explanation thereof will be omitted.

The segmentation process section 64 also outputs the accepted digital signal to the zoom process section 65.

When the operation panel 4 accepts a indicator signal that represents a magnification, such as enlargement, reduction or the like, the zoom process section 65 enlarges or reduces the output size of an image on the basis of the accepted indicator signal. The zoom process section 65 enlarges or reduces an image by performing an interpolation operation for pixels in a main scanning direction and pixels in a sub-scanning direction of an image that is indicated by a digital signal outputted from the segmentation process section 64 to cause duplication or downsampling of pixels. The zoom process section 65 outputs to outside a digital signal that represents an enlarged or reduced image. The zoom process section 65 also outputs a zoom level m of the image to outside.

It should be noted that the description of Embodiment 3 explains an example of an interpolation operation for pixels in a main scanning direction and pixels in a sub-scanning direction of an image. However, the present invention is not limited to this. The present invention may carry out an optical zoom process for pixels in a sub-scanning direction and perform an interpolation operation for pixels in a primary scanning direction.

As described above, the image reading apparatus outputs a digital signal, a document type discrimination signal, a segmentation class signal and a zoom level m to an external device. The external device is, for example, a color printer, a digital color complex machine or an electronic computer, which can communicate with the image reading apparatus via a communication network. When accepting a digital signal, a document type discrimination signal, a segmentation class signal and a zoom level m outputted from the image reading apparatus, the external device selects the most suitable dither matrix on the basis of the accepted document type discrimination signal, the segmentation class signal and the magnification m. The external device executes a halftone process so as to reproduce the image indicated by the digital signal in halftone using the selected dither matrix.

It should be noted that the document type discrimination process, the segmentation process, the matrix selection process and the zoom process are the same as the processes shown in the above description of Embodiments 1 and 2, and detailed explanation thereof will be omitted.

It should be noted that the above description of Embodiment 3 explains an example in which the image processing apparatus 6 executes the document type discrimination process at the document type automatic discrimination section 62 and executes the segmentation process at the segmentation process section 64. However, the present invention is not limited to this. The image processing apparatus 6 may execute any one of the document type discrimination process and the segmentation process, or none of the processes.

(Embodiment 4)

Figure 14:
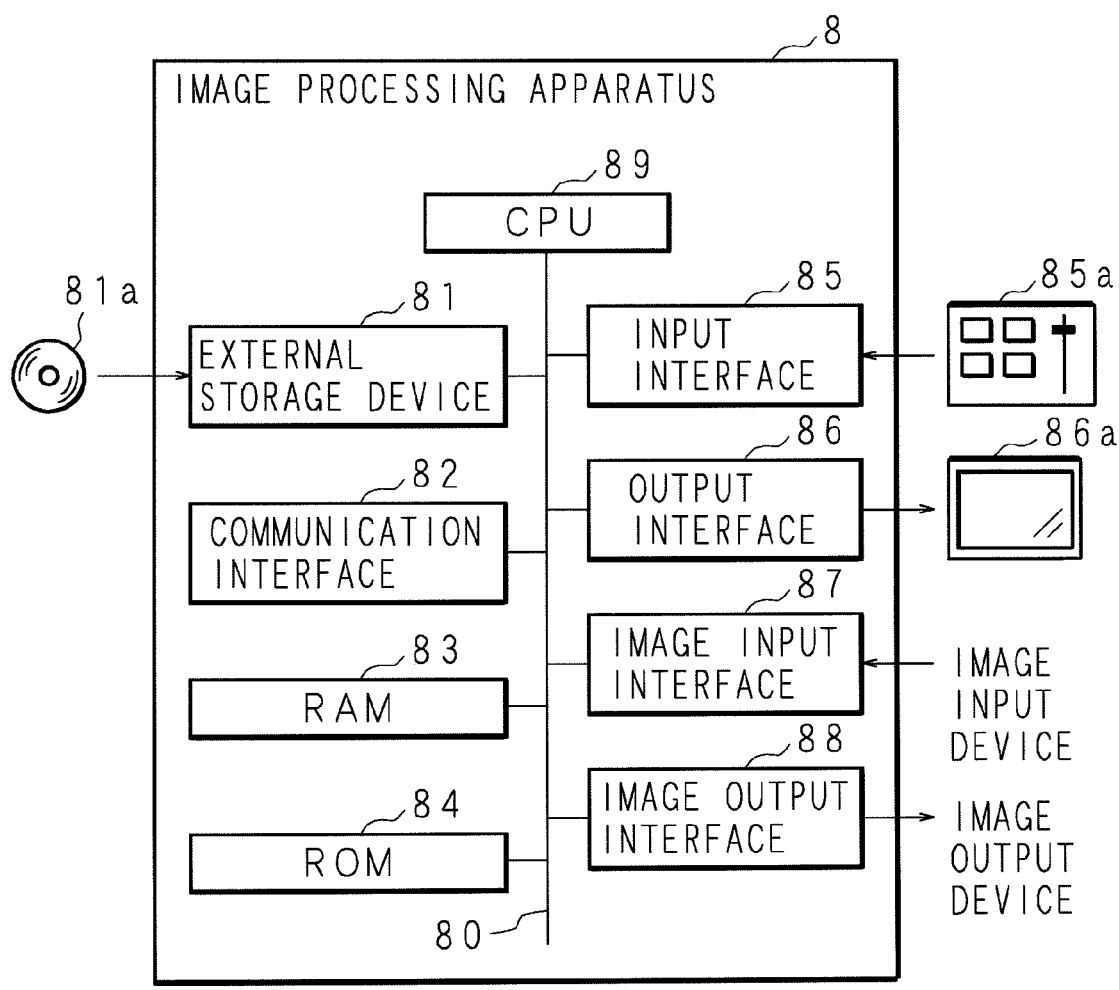
FIG. 14 is a block diagram for showing an entire structure of an image processing apparatus according to Embodiment 4.

The description of the above embodiments explains an example that an image processing apparatus is provided with respective hardware such as an A/D converter, a shading correction section and the like, and the respective hardware execute various processes. However, the present invention is not limited to this. A CPU provided in an image processing apparatus may execute various processes. In view of this fact, the description of Embodiment 4 will explain an example in which a CPU provided in an image processing apparatus executes various processes. FIG. 14 is a block diagram for showing the entire structure of an image processing apparatus according to Embodiment 4.

A numeral 8 in the figure is an image processing device, which is composed of an external storage device 81, a communication interface 82, a RAM 83, a ROM 84, an input interface 85, an output interface 86, an image input interface 87, an image output interface 88 and a CPU 89. The respective hardware in the image processing apparatus 8 is interconnected via a bus 80.

The external storage device 81 is a section for reading out a program or data which is stored in a computer program product 81*a*. When the computer program product 81*a* is inserted into an insertion opening (not illustrated), the external storage device 81 reads out a program or the like stored in the inserted computer program product 81*a* and outputs the read program or the like to the ROM 84.

The computer program product 81*a* stores programs (a program code of a control program, an execute form program, an intermediate code program and a source program) for causing the CPU 89 to control the respective hardware of the image processing apparatus 8.

The computer program product 81*a* is, for example, an optical disk such as a DVD (Digital Versatile Disc) or a CD (Compact Disc); a magnetic disk such as a flexible disk or a hard disk; a semiconductor card such as an IC card; a semiconductor memory such as a mask ROM, an EPROM, an EEROM or a flash ROM; a magnetic tape or the like.

The communication interface 82 is the terminating section of the communication network and functions as the contact with an external device via the communication network. The communication network is, for example, the Internet, an intranet, an extranet, a LAN, an ISDN line network, a VAN, a CATV communication network, a VPN (Virtual Private Network), a telephone network, a mobile communication network, a satellite communication network or the like. The communication interface 82 receives data, a program or the like accepted from outside and outputs the received data, program or the like to the RAM 83.

A transmission medium to be used by the communication interface 82 is not only a wire medium such as the IEEE1334, the USB, a power line carrier, a CATV line, a telephone line or an ADSL line but also a wireless medium such as an infrared ray, the Buletooth (registered trademark), the 802.11 wireless, the HDR, a mobile telephone line, satellite connection or a digital terrestrial network.

The RAM 83 is constituted of a SRAM or a DRAM, which stores a program read out from the RAM 83 and various data to be generated by execution of the program, for example.

The ROM 84 is constituted of a flash memory or the like, which stores a computer program for causing a computer to execute an image processing method according to the present invention, for example.

The input interface 85 is connected with an operation panel 85*a*. The operation panel 85*a* is provided with a plurality of manual operation buttons and -outputs a signal corresponding to a pressed manual operation button. The outputted signal is stored in the RAM 83.

The output interface 86 is connected with a liquid crystal monitor 86*a*. The output interface 86 converts various data stored in the RAM 83 into an image and outputs the image obtained by conversion to the liquid crystal monitor 86*a*.

The image input interface 87 is connected with an image input device that is an external device. The image input device is, for example, a flatbed scanner, a film scanner, a digital camera or the like. The image output interface 88 is connected with an image output device that is an external device. The image output device is, for example, a printer. The image processing apparatus 8 is connected with an image input device and an image output device, making up an image processing system.

The CPU 89 controls the respective hardware provided in the image processing apparatus 8 and executes an image processing method according to the present invention depending on a program stored in the ROM 84. The CPU 89 executes a document type discrimination process, a segmentation process, a matrix selection process, a magnification varying process, a halftone process and the like in accordance with the program.

It should be noted that these processes are the same as the processes in Embodiments 1 to 3 described above and detailed explanation thereof will be omitted.

It should be noted that the above description of Embodiments 1 and 2 explains an example in which an image forming system is a digital color copying machine. However, the present invention is not limited to this and the image forming system may be, for example, a digital color complex machine which is provided with a copy function, a print function, a facsimile function, the Scan to e-mail function and the like. In this case, the image forming system is provided with a communication interface such as a network card and a modem, and can communicate with outside.

For example, for transmitting image data with a facsimile function, the image forming system follows a procedure for transmission with a destination at the modem to ensure transmission. The image forming system then reads out image data, which is compressed in a predetermined format, from a memory storing the image data and carries out a predetermined process, such as changing of a compression format, for the read image data. Image data obtained by carrying out the predetermined process is sequentially transmitted to a destination via a communication line.

For receiving image data with a facsimile function, the image forming system accepts a procedure for transmission from a source at the modem to ensure communication. The image forming system then receives image data transmitted from the source and inputs the received image data to the image processing apparatus. The image processing apparatus carries out an expansion process for the inputted image data and carries out a rotation process or a resolution changing process if required. The image processing apparatus further carries out output tone correction and a tone reproduction process for the image data and outputs an image indicated by the processed image data to an image output device. The image output device outputs the image.

The image forming system can communicate data with an electronic computer or another image forming system that is connected to the network via a communication interface.

The above description of Embodiments 1 and 2 explains an example of an image forming system that processes a color image. However, the present invention is not limited to this and may be an image forming system for processing a monochrome image.

As this invention may be embodied in several forms without departing from the spirit of essential textistics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method for setting a zoom level, executing a zoom process to an image data corresponding to the set zoom level, and then dithering the image data with a dither matrix that is selected on the basis of the set zoom level, comprising:
    a step of selecting a dither matrix used for a higher resolution in a case that the set zoom level is equal or less than a first zoom level, and a dither matrix used for a lower resolution in a case that the set zoom level is equal or more than a second zoom level, which is higher than the first zoom level; and
    a step of dithering the image data, after executing the zoom process, using the selected dither matrix.

2. The image processing method according to claim 1, further comprising:
    a step of judging whether the image data belongs to a halftone dot area, wherein
    a dither matrix is selected on the basis of the set zoom level, when it is judged to belong to the halftone dot area.

3. The image processing method according to claim 1, further comprising:

a step of judging whether a document indicated by the image data comprises a printed picture constituted with halftone dots, wherein a dither matrix is selected on the basis of the set zoom level, when it is judged to comprise the printed picture.

4. An image processing apparatus for dithering an image data with a dither matrix, comprising:

a receiving unit that receives a zoom level;

a zoom process unit that executes a zoom process to an image data on the basis of the zoom level received by the receiving unit;

a storage unit that stores a plurality of dither matrices each having a different resolution;

a selecting unit that selects a dither matrix from the plurality of dither matrices, on the basis of the received zoom level; and a dithering unit that carries out a dither process to the image data, after executing the zoom process by the zoom process unit, with the selected dither matrix, wherein the selecting unit selects a dither matrix used for a higher resolution in a case that the receiving unit receives the zoom level equal or less than a first zoom level, and a dither matrix used for a lower resolution in a case that the receiving unit receives the zoom level equal or more than a second zoom level, which is higher than the first zoom level.

5. The image processing apparatus according to claim 4, further comprising:

a segmentation process unit that judges at least whether the image data belongs to a halftone dot area, wherein the selecting unit is allowed to select a dither matrix from the plurality of dither matrices, on the basis of the received zoom level, when the segmentation process unit judges that the image data belongs to the halftone dot area.

6. The image processing apparatus according to claim 4, further comprising:

a document type discrimination unit judges at least whether a document indicated by the image data comprises a printed picture constituted with halftone dots, wherein the selecting unit is allowed to select a dither matrix from the plurality of dither matrices, on the basis of the received zoom level, when the document type discrimination unit judges that the image data comprises the printed picture.

7. An image forming system, comprising:

an image processing apparatus for dithering an image data with a dither matrix and an image forming unit that forms an image corresponding to the image data which is processed for dithering by the image processing apparatus, wherein the image processing apparatus comprises:

a receiving unit that receives a zoom level;

a zoom process unit that executes a zoom process to an image data on the basis of the zoom level received by the receiving unit;

a storage unit that stores a plurality of dither matrices each having a different resolution;

a selecting unit that selects a dither matrix from the plurality of dither matrices, on the basis of the received zoom level; and a dithering unit that carries out a dither process to the image data, after executing the zoom process by the zoom process unit, with the selected dither matrix, wherein the selecting unit selects a dither matrix used for a higher resolution in a case that the receiving unit receives the zoom level equal or less than a first zoom level, and the dither matrix used for a lower resolution in a case that the receiving unit receives the zoom level equal or more than a second zoom level, which is higher than the first zoom level.

8. The image forming system according to claim 7, wherein the image processing apparatus further comprises:

a segmentation process unit that judges at least whether the image data belongs to a halftone dot area, wherein the selecting unit is allowed to select a dither matrix from the plurality of dither matrices, on the basis of the received zoom level, when the segmentation process unit judges that the image data belongs to the halftone dot area.

9. The image forming system according to claim 7, wherein the image processing apparatus further comprises:

a document type discrimination unit that judges at least whether a document indicated by the image data comprises a printed picture constituted with halftone dots, wherein the selecting unit is allowed to select a dither matrix from the plurality of dither matrices, on the basis of the received zoom level, when the document type discrimination unit judges that the image data comprises the printed picture.

10. A non-transitory recording medium readable by a computer, recording a computer program for causing a computer to set a zoom level, execute a zoom process to an image data corresponding to the set zoom level, and then dither the image data with a dither matrix that is selected on the basis of the set zoom level, wherein the computer program comprises:

a step of causing the computer to select a dither matrix used for a higher resolution in a case that the set zoom level is equal or less than a first zoom level and a dither matrix used for a lower resolution in a case that the set zoom level is equal or more than a second zoom level, which is higher than the first zoom level; and a step of causing the computer to dither the image data, after executing the zoom process, using the selected dither matrix.

11. The recording medium according to claim 10, wherein the computer program further comprises:

a step of causing the computer to judge whether the image data belongs to a halftone dot area, wherein the computer is caused to select a dither matrix on the basis of the set zoom level, when the computer judges to belong to the halftone dot area.

12. The recording medium according to claim 10, wherein the computer program further comprises:

a step of causing the computer to judge whether a document indicated by the image data comprises a printed picture constituted with halftone dots, wherein the computer is caused to select a dither matrix on the basis of the set zoom level, when the computer judges to comprise the printed picture.

* * * * *